US012142956B2

(12) United States Patent
Niwa et al.

(10) Patent No.: US 12,142,956 B2
(45) Date of Patent: Nov. 12, 2024

(54) PORTABLE CHARGER

(71) Applicant: TOYOTA JIDOSHA KABUSHIKI KAISHA, Toyota (JP)

(72) Inventors: Yamato Niwa, Kariya (JP); Tomoya Ono, Toyota (JP); Toru Ando, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 467 days.

(21) Appl. No.: 17/646,792

(22) Filed: Jan. 3, 2022

(65) Prior Publication Data
US 2022/0247191 A1 Aug. 4, 2022

(30) Foreign Application Priority Data
Feb. 1, 2021 (JP) .................. 2021-014337

(51) Int. Cl.
*H02J 7/00* (2006.01)
*B60L 53/16* (2019.01)
*B60L 53/18* (2019.01)
*B60L 53/22* (2019.01)
*H02J 7/02* (2016.01)

(52) U.S. Cl.
CPC ............ *H02J 7/0042* (2013.01); *B60L 53/16* (2019.02); *B60L 53/18* (2019.02); *B60L 53/22* (2019.02); *H02J 7/0047* (2013.01); *H02J 7/02* (2013.01); *B60L 2210/30* (2013.01); *H02J 2207/20* (2020.01)

(58) Field of Classification Search
CPC ........... H02J 7/0042; H02J 7/0047; H02J 7/02
See application file for complete search history.

(56) References Cited

U.S. PATENT DOCUMENTS

| | | | |
|---|---|---|---|
| 2012/0300526 A1* | 11/2012 | Chuang ............. | H02J 13/00001 363/146 |
| 2013/0260595 A1 | 10/2013 | Tamaki et al. | |
| 2016/0159231 A1* | 6/2016 | Jefferies .................. | B60L 53/60 320/109 |

FOREIGN PATENT DOCUMENTS

| | | |
|---|---|---|
| JP | 2009-194958 A | 8/2009 |
| JP | 2013-207829 A | 10/2013 |
| JP | 2020-043636 A | 3/2020 |

* cited by examiner

*Primary Examiner* — Robert Grant
(74) *Attorney, Agent, or Firm* — Sughrue Mion, PLLC

(57) ABSTRACT

A portable charger includes: an AC input unit; a DC output unit; a power conversion circuit; and a controller. The DC output unit includes a start switch. When the start switch is operated by a user, the start switch instructs the controller to control the power conversion circuit such that the DC output unit outputs DC power. However, when at least one of the AC input unit and the DC output unit is unconnected, the start switch is disabled.

9 Claims, 12 Drawing Sheets

PORTABLE CHARGER

This nonprovisional application is based on Japanese Patent Application No. 2021-014337 filed on Feb. 1, 2021 with the Japan Patent Office, the entire contents of which are hereby incorporated by reference.

BACKGROUND

Field

The present disclosure relates to a portable charger, and particularly to a portable charger that receives AC power and outputs DC power.

Description of the Background Art

For example, Japanese Patent Laying-Open No. 2020-043636 discloses a portable charger that receives AC power and outputs DC power.

SUMMARY

According to the portable charger described in Japanese Patent Laying-Open No. 2020-043636, a power storage device of a vehicle can be charged using electric vehicle supply equipment (EVSE) that supplies AC power. A user can start charging by connecting the portable charger to both of the EVSE and the vehicle, and then, operating a start switch provided on the EVSE. However, the above-described process at the start of charging is burdensome for the user, and requesting the user to perform such a process at the start of charging causes a reduction in user convenience. The portable charger described in Japanese Patent Laying-Open No. 2020-043636 has room for improvement in terms of user convenience.

The present disclosure has been made to solve the above-described problem, and an object of the present disclosure is to provide a portable charger with enhanced user convenience in a process at the start of charging.

A portable charger according to the present disclosure includes: an AC input unit; a DC output unit; a power conversion circuit; and a controller. The AC input unit is connectable to an output unit of a power supply facility, and the AC input unit receives AC power from the output unit of the power supply facility. The DC output unit is connectable to a power reception unit of a power supply target, and the DC output unit outputs DC power to the power reception unit of the power supply target. The power conversion circuit converts the AC power input from the AC input unit into DC power and outputs the DC power to the DC output unit. The controller controls the power conversion circuit. The DC output unit includes a start switch. When the start switch is operated by a user, the start switch instructs the controller to control the power conversion circuit such that the DC output unit outputs the DC power. The portable charger is configured such that when at least one of the AC input unit and the DC output unit is unconnected, the start switch is disabled.

According to the above-described portable charger, the user can start power supply (supply of the DC power) to the power supply target by connecting the AC input unit of the portable charger to the output unit of the power supply facility, and then, connecting the DC output unit of the portable charger to the power reception unit of the power supply target, and further, operating the start switch provided on the DC output unit. Since the user is likely to hold the DC output unit in hand and connect the DC output unit to the power reception unit, it is easy for the user to operate the start switch after connection of the DC output unit. The user can perform connection of the DC output unit and operation of the start switch as a series of process. Therefore, according to the above-described configuration, user convenience in the process at the start of charging can be enhanced.

In the above-described portable charger, the DC output unit is provided with the start switch. Therefore, the user may operate the start switch by mistake when the user holds the DC output unit in hand and connects the DC output unit to the power reception unit. Output of the DC power to the DC output unit, with the DC output unit unconnected to the power reception unit, is undesirable because it may cause wasteful power consumption or failure. Thus, the above-described portable charger is configured such that when at least one of the AC input unit and the DC output unit is unconnected, the start switch is disabled. As a result, output of the DC power to the DC output unit, with the DC output unit unconnected to the power reception unit, can be suppressed.

The above-described portable charger may further include a presentation device described below. The presentation device provides a first presentation when the start switch is operated by the user, with both of the AC input unit and the DC output unit connected, and provides a second presentation different from the first presentation when the start switch is operated by the user, with at least one of the AC input unit and the DC output unit unconnected.

According to the above-described configuration, the user can more easily grasp a connection state of the AC input unit and the DC output unit when the start switch is operated.

The start switch may be capable of lighting. The presentation device may switch a lighting state of the start switch between the first presentation and the second presentation.

When the user operates the start switch, the user is highly likely to see the start switch. Therefore, according to the above-described configuration, the user can more easily check the first presentation and the second presentation.

The above-described portable charger may further include a lock mechanism that switches the start switch between a locked state and an unlocked state, the locked state being a state in which operation of the start switch by the user is restricted, the unlocked state being a state in which operation of the start switch by the user is permitted. The above-described portable charger may be configured such that when at least one of the AC input unit and the DC output unit is unconnected, the lock mechanism brings the start switch into the locked state, thereby disabling the start switch.

According to the above-described configuration, the user can recognize whether the start switch is enabled or disabled, based on whether or not the start switch can be operated as usual.

The above-described portable charger may further include an input device that accepts a setting of timer charging from the user. The above-described portable charger may be configured such that when the timer charging is set by the user, the start switch is disabled.

The timer charging is charging in accordance with a preset schedule. In the timer charging, charging is started at the preset start time. According to the above-described configuration, the start of charging caused by the operation of the start switch and the start of charging caused by arrival of the start time of the timer charging can be used depending on the situation.

The input device may be arranged on the DC output unit.

Since the user is likely to hold the DC output unit in hand and connect the DC output unit to the power reception unit, it is easy for the user to operate the input device after connection of the DC output unit. According to the above-described configuration, the user can perform connection of the DC output unit and setting of the timer charging as a series of process.

Any portable charger described above may be applied to charging of a power storage device of a vehicle. More specifically, any portable charger described above may be configured as described below.

In any portable charger described above, the power supply target may be a vehicle including a power storage device. The power reception unit may be a DC power inlet of the vehicle. The DC output unit may be a DC connector connectable to the DC power inlet.

The power supply facility may be first electric vehicle supply equipment including an electrical outlet. The output unit may be the electrical outlet of the first electric vehicle supply equipment. The AC input unit may be an AC plug connectable to the electrical outlet.

The power supply facility may be second electric vehicle supply equipment including a cable. The output unit may be a connector of the cable of the second electric vehicle supply equipment. The AC input unit may be an AC inlet connectable to the connector of the cable.

Any portable charger described above may further include: a housing; a first cable; and a second cable. The housing may have the power conversion circuit built thereinto. The power conversion circuit may be connected to the AC input unit through the first cable and connected to the DC output unit through the second cable.

Although the power conversion circuit may be built into one of the AC input unit and the DC output unit, space for accommodating the power conversion circuit is required to have the power conversion circuit built thereinto. In the above-described configuration, the power conversion circuit is provided in the housing connectable to each of the AC input unit and the DC output unit through the cables, and thus, a reduction in size of the AC input unit and the DC output unit is achieved.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
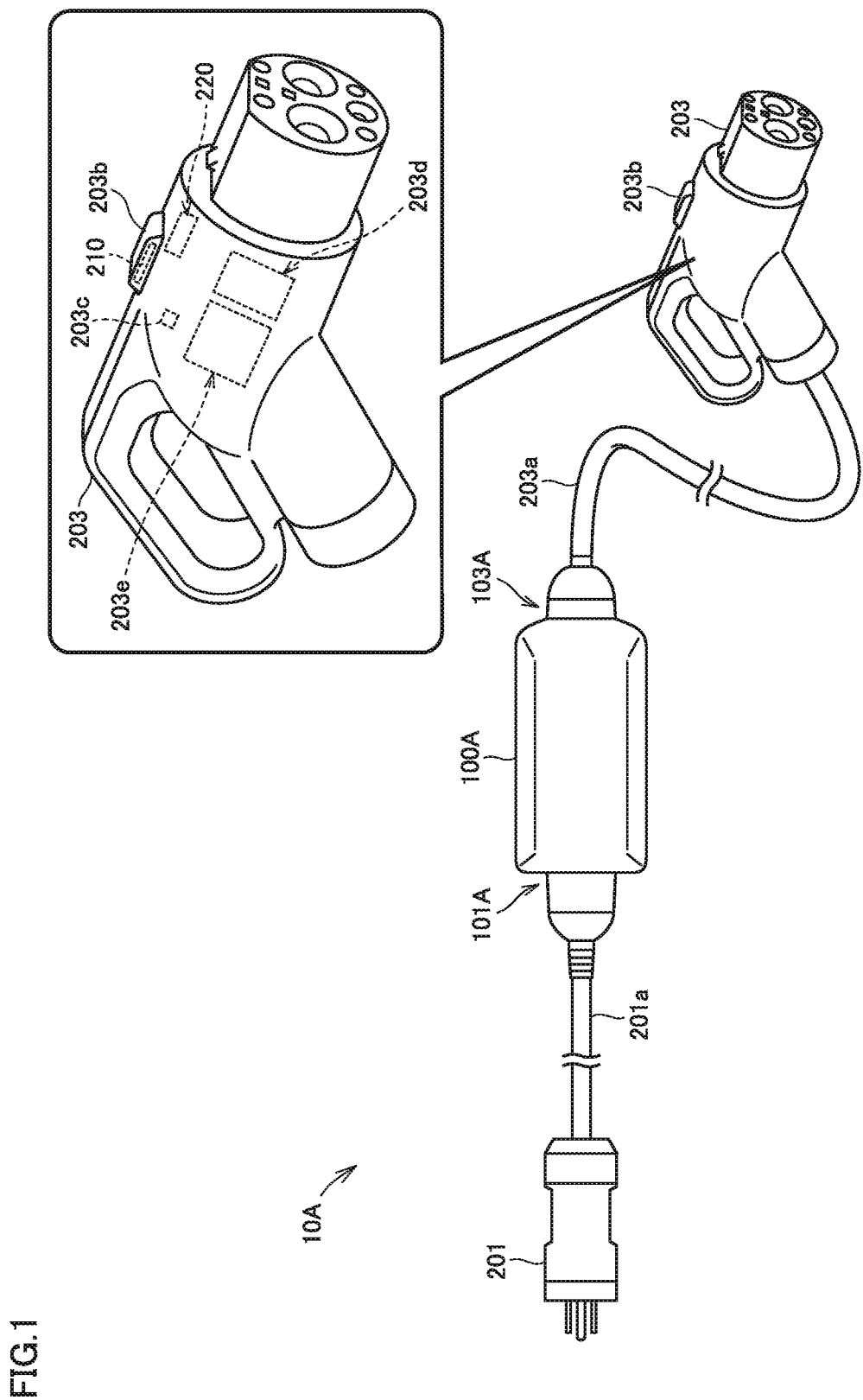
FIG. 1 shows an example of an appearance of a portable charger according to an embodiment of the present disclosure.

An embodiment of the present disclosure will be described in detail with reference to the drawings, in which the same or corresponding portions are denoted by the same reference characters and description thereof will not be repeated.

FIG. 1 shows an example of an appearance of a portable charger according to the present embodiment. Referring to FIG. 1, a charger 10A is a portable charger including a housing 100A, an AC plug 201 and a DC connector 203. Housing 100A is connected to AC plug 201 through a cable 201a, and connected to DC connector 203 through a cable 203a. Housing 100A also includes an AC port 101A that receives AC power received by AC plug 201, and a DC port 103A that outputs DC power to DC connector 203. Each of cables 201a and 203a includes an electrical wire. A first electrical wire in cable 201a and a second electrical wire in cable 203a are connected to a circuit in housing 100A through AC port 101A and DC port 103A, respectively. In the present embodiment, AC plug 201 and DC connector 203 correspond to examples of "AC input unit" and "DC output unit" according to the present disclosure, respectively. Cable 201a and cable 203a correspond to examples of "first cable" and "second cable" according to the present disclosure, respectively.

In charger 10A according to the present embodiment, DC connector 203 includes a start button 203b, a detector 203c, an operation panel 203d, and a display 203e. Start button 203b is capable of lighting. Start button 203b includes a light emitter 210 (e.g., a light emitting diode). In the present embodiment, start button 203b corresponds to an example of "start switch" according to the present disclosure. A lock mechanism 220 is provided inside DC connector 203. Details of a configuration of DC connector 203 will be described below.

Figure 2:
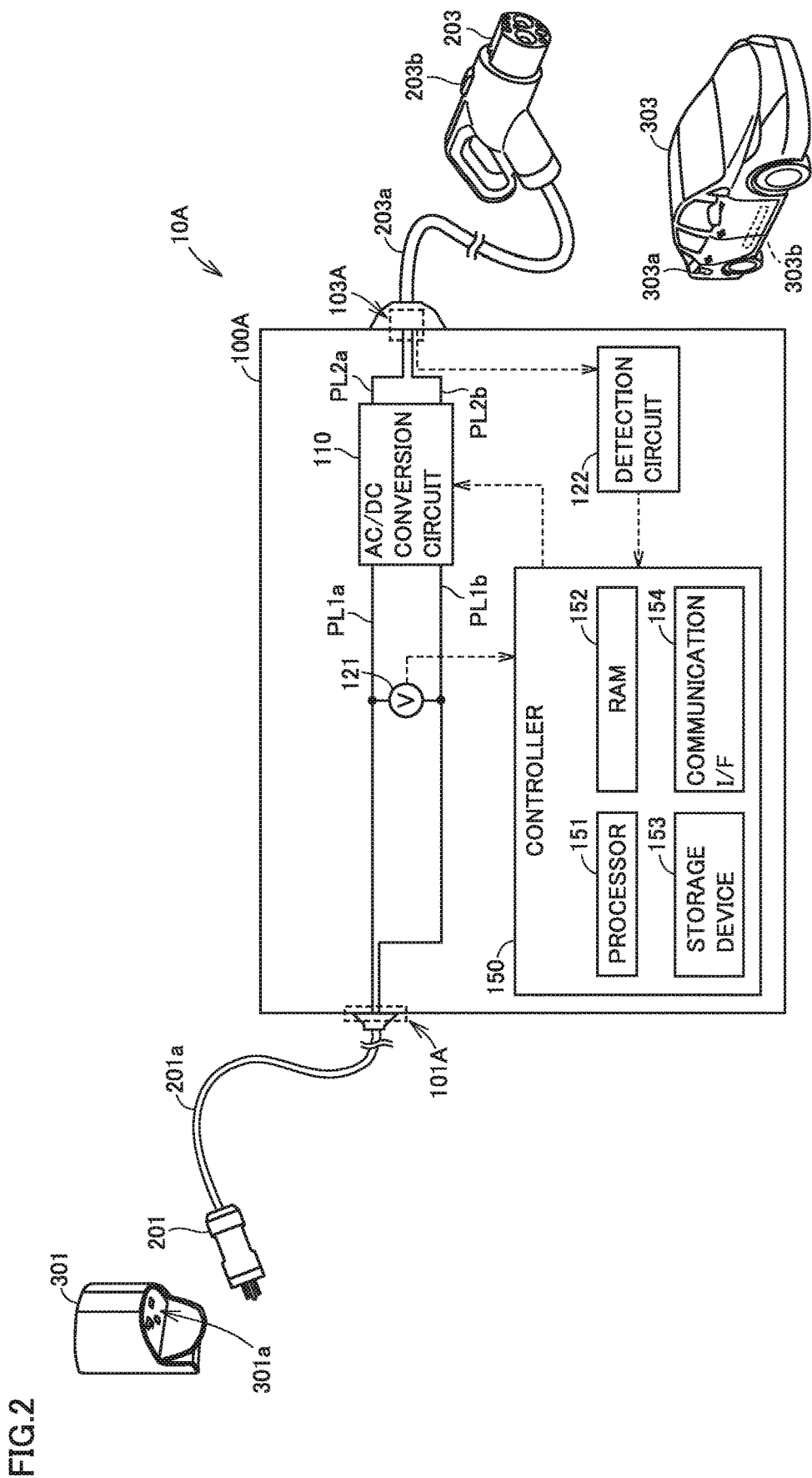
FIG. 2 shows a configuration in a housing of the portable charger according to the embodiment of the present disclosure.

FIG. 2 shows a configuration of charger 10A according to the present embodiment. FIG. 2 shows charger 10A in an enlarged manner, and charger 10A is a portable charger that can be loaded and unloaded onto/from a vehicle 303.

Referring to FIGS. 1 and 2, charger 10A includes housing 100A. Charger 10A includes, inside housing 100A, an AC/DC conversion circuit 110, a voltage sensor 121, a detection circuit 122, and a controller 150. Charger 10A includes, outside housing 100A, AC plug 201 and DC connector 203. AC plug 201 and AC port 101A are connected to each other through cable 201a. DC connector 203 and DC port 103A are connected to each other through cable 203a.

Vehicle 303 includes a DC inlet (DC power inlet) 303a and a power storage device 303b. Vehicle 303 is, for example, a battery electric vehicle that travels using electric power stored in power storage device 303b. Power storage device 303b is, for example, a secondary battery that supplies electric power to a motor for traveling (not shown) of vehicle 303. Power storage device 303b may be an assembled battery including a plurality of lithium ion secondary batteries. DC connector 203 is used to electrically connect charger 10A to power storage device 303b. DC connector 203 is connectable to DC inlet 303a of vehicle 303. In the present embodiment, vehicle 303 and DC inlet 303a correspond to examples of "power supply target" and "power reception unit" according to the present disclosure, respectively.

Electric vehicle supply equipment (EVSE) 301 supplies AC power for charging power storage device 303b. EVSE 301 includes an AC outlet (AC power outlet) 301a. AC plug 201 is connectable to AC outlet 301a of EVSE 301. In a connected state, the AC power output from AC outlet 301a is input to AC plug 201. EVSE 301 may be non-public EVSE (e.g., EVSE for home use) that can be used only by a specific user. In the present embodiment, EVSE 301 and AC outlet 301a correspond to examples of "power supply facility" and "output unit" according to the present disclosure, respectively. EVSE 301 corresponds to an example of "first electric vehicle supply equipment" according to the present disclosure.

Controller 150 controls AC/DC conversion circuit 110. AC/DC conversion circuit 110 converts the AC power input from AC port 101A into DC power and outputs the DC power to DC port 103A. AC/DC conversion circuit 110 according to the present embodiment corresponds to an example of "power conversion circuit" according to the present disclosure. A circuit configuration in housing 100A will be described in detail below.

Power lines PL1a and PL1b are connected to a first end of AC/DC conversion circuit 110, and power lines PL2a and PL2b are connected to a second end of AC/DC conversion circuit 110. During charging, the AC power is input to the first end of AC/DC conversion circuit 110, and the DC power is output from the second end of AC/DC conversion circuit 110.

Figure 3:
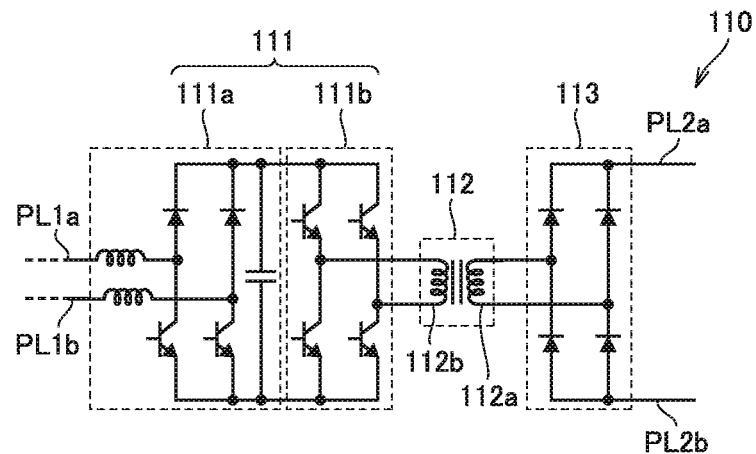
FIG. 3 shows an example of a circuit configuration of an AC/DC conversion circuit shown in FIG. 1.

FIG. 3 shows an example of a circuit configuration of AC/DC conversion circuit 110. Referring to FIG. 3 together with FIG. 2, AC/DC conversion circuit 110 includes a power factor correction (PFC) circuit 111, an insulating circuit 112 and a rectifier circuit 113.

PFC circuit 111 includes a rectifier circuit 111a and an inverter 111b. Rectifier circuit 111a rectifies and steps up the input AC power. More specifically, rectifier circuit 111a includes two sets of upper and lower arms, two reactors and one smoothing capacitor. In each set of upper and lower arms, the upper arm includes a diode and the lower arm includes a switching element. The switching element of the lower arm is controlled by controller 150. Each switching element included in rectifier circuit 111a is controlled by controller 150, thereby allowing rectifier circuit 111a to function as a step-up chopper circuit.

Inverter 111b is a full bridge circuit including four switching elements. Each switching element is controlled by controller 150. Each switching element included in inverter 111b is controlled by controller 150, thereby converting the DC power input from rectifier circuit 111a to inverter 111b into high-frequency AC power.

Insulating circuit 112 is an insulating transformer including coils 112a and 112b. Rectifier circuit 113 is connected to coil 112a through an electrical wire, and PFC circuit 111 is connected to coil 112b through an electrical wire. Coil 112a and coil 112b are electrically insulated from each other. Insulating circuit 112 steps up an AC voltage applied to coil 112b and outputs the stepped-up voltage to coil 112a.

Rectifier circuit 113 is a diode bridge circuit including four diodes. Rectifier circuit 113 converts the AC power supplied from coil 112a of insulating circuit 112 into DC power.

With the above-described configuration, AC/DC conversion circuit 110 performs AC/DC conversion (conversion from AC to DC) of the AC power input from AC plug 201 (see FIG. 2) to power lines PL1a and PL1b during charging, and outputs DC power to power lines PL2a and PL2b. More specifically, rectifier circuit 111a rectifies and steps up the AC power input to power lines PL1a and PL1b and outputs DC power to inverter 111b, and inverter 111b converts the DC power received from rectifier circuit 111a into high-frequency AC power. Insulating circuit 112 transmits the output (AC power) of inverter 111b to rectifier circuit 113, and rectifier circuit 113 rectifies the AC power received from insulating circuit 112 and outputs the rectified power to power lines PL2a and PL2b.

The configuration of AC/DC conversion circuit 110 is not limited to the configuration shown in FIG. 3. For example, AC/DC conversion circuit 110 may be a rectifier circuit that does not include an insulating circuit. Various sensors (e.g., a current sensor and a voltage sensor) may be provided at appropriate positions of the circuit shown in FIG. 3 in order to obtain information used by controller 150 for control.

Referring again to FIG. 2, voltage sensor 121 detects a voltage between power line PL1a and power line PL1b. The voltage between power line PL1a and power line PL1b corresponds to an input voltage of AC/DC conversion circuit 110. A result of detection by voltage sensor 121 is output to controller 150. Based on the output of voltage sensor 121, controller 150 determines whether or not AC plug 201 is connected. When the AC power is input to AC/DC conversion circuit 110, controller 150 determines that AC plug 201 is connected to AC outlet 301a. However, a method for detecting whether or not AC plug 201 is connected is not limited to voltage sensor 121.

Detection circuit 122 detects whether or not DC connector 203 is connected, based on a change in electric resistance when DC connector 203 is connected to DC inlet 303a. A result of detection by detection circuit 122 is output to controller 150. A method for detecting whether or not DC connector 203 is connected is not limited to detection circuit 122. Whether or not DC connector 203 is connected may be detected by a signal transmitted from vehicle 303 to controller 150 when DC connector 203 is connected to DC inlet 303a. Alternatively, whether or not DC connector 203 is connected may be detected by a connection sensor (not shown) provided in DC connector 203.

Each of AC port 101A and DC port 103A includes a wiring hole. Power lines PL1a and PL1b extend from AC/DC conversion circuit 110 located inside housing 100A to AC plug 201 located outside housing 100A through AC port 101A (wiring hole) and the inside of cable 201a. Power lines PL2a and PL2b extend from AC/DC conversion circuit 110 located inside housing 100A to DC connector 203 located outside housing 100A through DC port 103A (wiring hole) and the inside of cable 203a. A signal line (not shown) between controller 150 and vehicle 303 also passes through DC port 103A (wiring hole).

Controller 150 includes a processor 151, a random access memory (RAM) 152, a storage device 153, and a communication interface (I/F) 154. Processor 151 may be a central processing unit (CPU). RAM 152 functions as a working memory that temporarily stores data processed by processor 151. Storage device 153 is capable of saving stored information. Storage device 153 includes, for example, a read only memory (ROM) and a rewritable non-volatile memory. Communication I/F 154 includes various communication I/Fs that allow controller 150 to communicate with vehicle 303. In addition to a program, information (e.g., a map, a mathematical equation and various parameters) used by the program is stored in storage device 153. In the present embodiment, processor 151 performs the program stored in storage device 153, thereby performing various types of control in controller 150.

Although not shown in FIG. 2, a power source circuit of controller 150 is provided in housing 100A. The power source circuit of controller 150 generates driving power for controller 150 (i.e., power for operating controller 150), using electric power supplied from a prescribed power source, and supplies the generated driving power to controller 150. The power source circuit of controller 150 may generate the driving power for controller 150, using a power source (e.g., a capacitor or a secondary battery) in housing 100A. Alternatively, the power source circuit of controller 150 may generate the driving power for controller 150, using the AC power supplied to AC port 101A. The power source circuit of controller 150 may be connected to power lines PL1a and PL1b.

Referring to FIGS. 1 and 2, light emitter 210 of start button 203b of DC connector 203 is controlled by controller 150. When start button 203b is pressed by the user, start button 203b instructs controller 150 to control AC/DC conversion circuit 110 such that DC connector 203 outputs the DC power. Detector 203c detects whether or not start button 203b is operated. When start button 203b is pressed, a charging start signal is transmitted from detector 203c to controller 150. The charging start signal corresponds to the above-described instruction to controller 150. When controller 150 receives the charging start signal, controller 150 controls AC/DC conversion circuit 110 as instructed, to cause DC connector 203 to output the DC power. Operation panel 203d is operated by the user. A charging condition may be set through operation panel 203d. Display 203e displays information about charging (e.g., charging power and charging time).

The user can start power supply (supply of the DC power) to vehicle 303 by connecting AC plug 201 of charger 10A to AC outlet 301a of EVSE 301, and then, connecting DC connector 203 of charger 10A to DC inlet 303a of vehicle 303, and further, pressing start button 203b provided on DC connector 203. Since the user is likely to hold DC connector 203 in hand and connect DC connector 203 to DC inlet 303a, it is easy for the user to press start button 203b after connection of DC connector 203. The user can perform connection of DC connector 203 and operation of start button 203b as a series of process. Therefore, according to charger 10A configured as described above, user convenience in the process at the start of charging can be enhanced.

In charger 10A, DC connector 203 is provided with start button 203b. Therefore, the user may operate start button 203b by mistake when the user holds DC connector 203 in hand and connects DC connector 203 to DC inlet 303a of vehicle 303. Output of the DC power to DC connector 203, with DC connector 203 unconnected to DC inlet 303a, is undesirable because it may cause wasteful power consumption or failure. Thus, in charger 10A according to the present embodiment, start button 203b is disabled when at least one of AC plug 201 and DC connector 203 is unconnected.

Lock mechanism 220 provided inside DC connector 203 switches start button 203b between a locked state and an unlocked state, the locked state being a state in which the operation of start button 203b by the user is restricted, the unlocked state being a state in which the operation of start button 203b by the user is permitted. Lock mechanism 220 is controlled by controller 150. In a state where there is no instruction from controller 150 (e.g., non-conductive state), lock mechanism 220 brings start button 203b into the locked state. When at least one of AC plug 201 and DC connector 203 is unconnected, lock mechanism 220 brings start button 203b into the locked state, thereby disabling start button 203b.

An example of lock mechanism 220 will be described below with reference to FIGS. 4 and 5.

Figure 4:
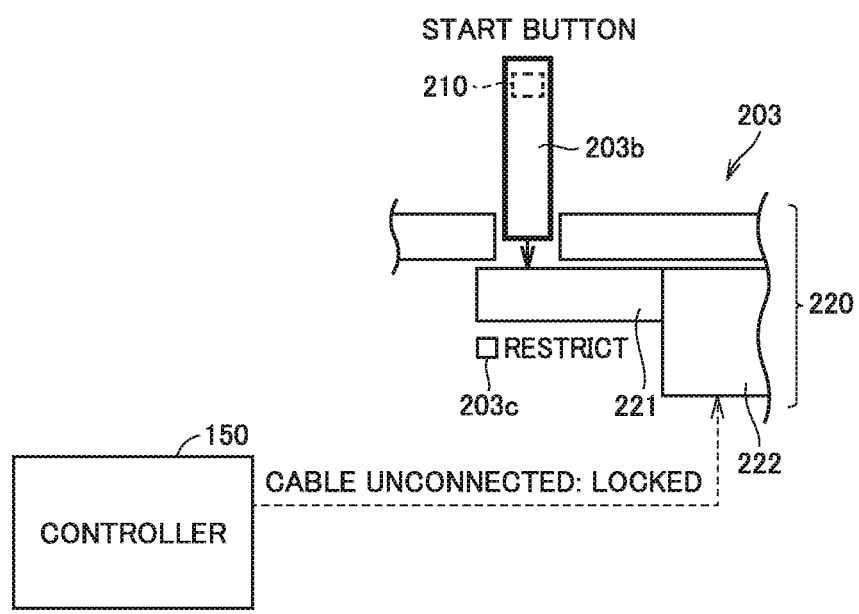
FIG. 4 shows a locked state by a lock mechanism of a DC connector shown in FIG. 1.

FIG. 4 shows lock mechanism 220 in the locked state. Referring to FIG. 4, lock mechanism 220 includes a restricting member 221, and an electromagnetic actuator 222 that drives restricting member 221. Actuator 222 is controlled by controller 150. Controller 150 controls actuator 222 to move restricting member 221 to a position where sliding of start button 203b is restricted, thereby bringing start button 203b into the locked state. When at least one of AC plug 201 and DC connector 203 is unconnected, controller 150 brings start button 203b into the locked state. When start button 203b enters the locked state, a movement of start button 203b in a push-in direction is restricted by restricting member 221. Therefore, the user cannot press start button 203b in the locked state. When start button 203b is in the locked state, detector 203c does not detect the operation of start button 203b, and thus, the charging start signal is not transmitted from detector 203c to controller 150. When start button 203b is in the locked state, controller 150 controls light emitter 210 to cause start button 203b to light out.

Figure 5:
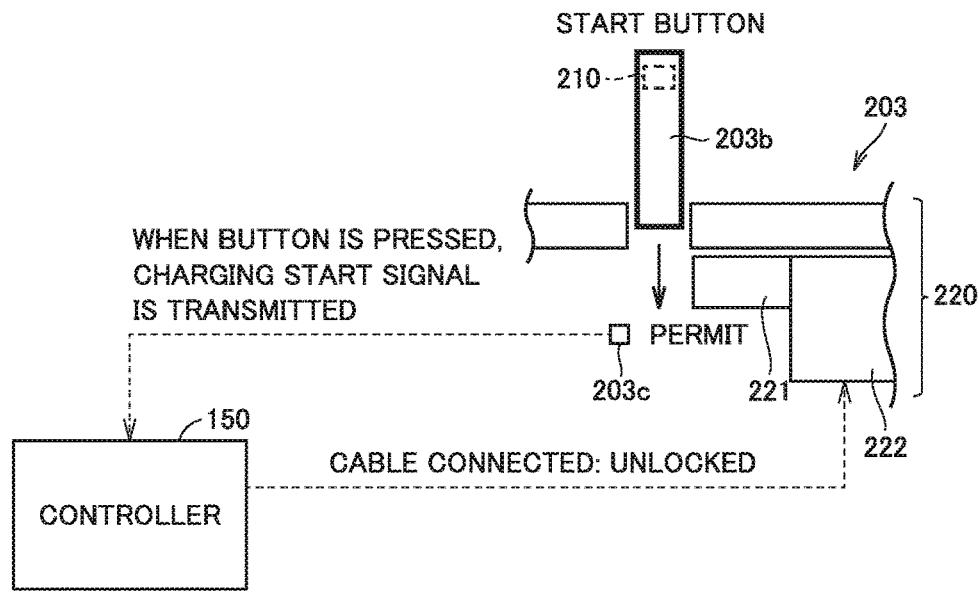
FIG. 5 shows an unlocked state by the lock mechanism of the DC connector shown in FIG. 1.

FIG. 5 shows lock mechanism 220 in the unlocked state. Referring to FIG. 5, controller 150 controls actuator 222 to move restricting member 221 to a position where sliding of start button 203b is not restricted, thereby bringing start button 203b into the unlocked state. When both of AC plug 201 and DC connector 203 are connected, controller 150 brings start button 203b into the unlocked state. When the user presses start button 203b in the unlocked state, the operation of start button 203b is detected by detector 203c and the charging start signal is transmitted from detector 203c to controller 150. When start button 203b is in the unlocked state, controller 150 controls light emitter 210 to cause start button 203b to light up.

Figure 6:
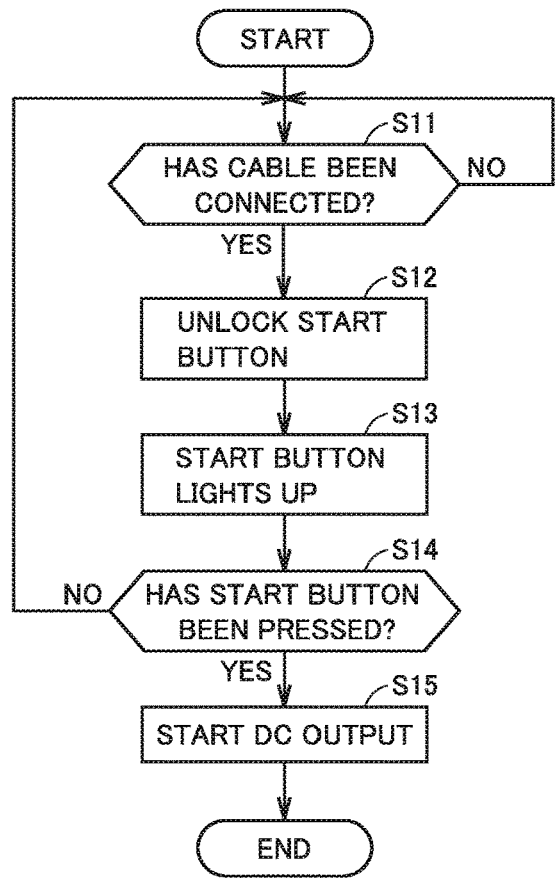
FIG. 6 is a flowchart showing a process related to the start of charging in charging control according to the embodiment of the present disclosure.

FIG. 6 is a flowchart showing a process related to the start of charging. The process shown in this flowchart is started, for example, when controller 150 starts up. Controller 150 may start up when AC plug 201 is connected to AC outlet 301a. Alternatively, controller 150 may start up when a power switch (not shown) of charger 10A is turned on. The power switch of charger 10A may be provided on housing 100A, or may be included in operation panel 203d. When a series of process shown in FIG. 6 is started, start button 203b is in the locked state (i.e., the state in which pressing is restricted) (see FIG. 4).

Referring to FIG. 6 together with FIGS. 1 and 2, in step (hereinafter, simply denoted as "S") 11, charger 10A awaits until both of AC plug 201 and DC connector 203 are connected. In S11, charger 10A determines whether or not both of AC plug 201 and DC connector 203 have been connected. When AC plug 201 is connected to AC outlet 301a and DC connector 203 is connected to DC inlet 303a, determination of YES is made in S11.

When determination of YES is made in S11, controller 150 controls lock mechanism 220 to bring start button 203b into the unlocked state in S12 (see FIG. 5). Furthermore, in S13, controller 150 controls light emitter 210 to cause start button 203b to light up.

Figure 7:
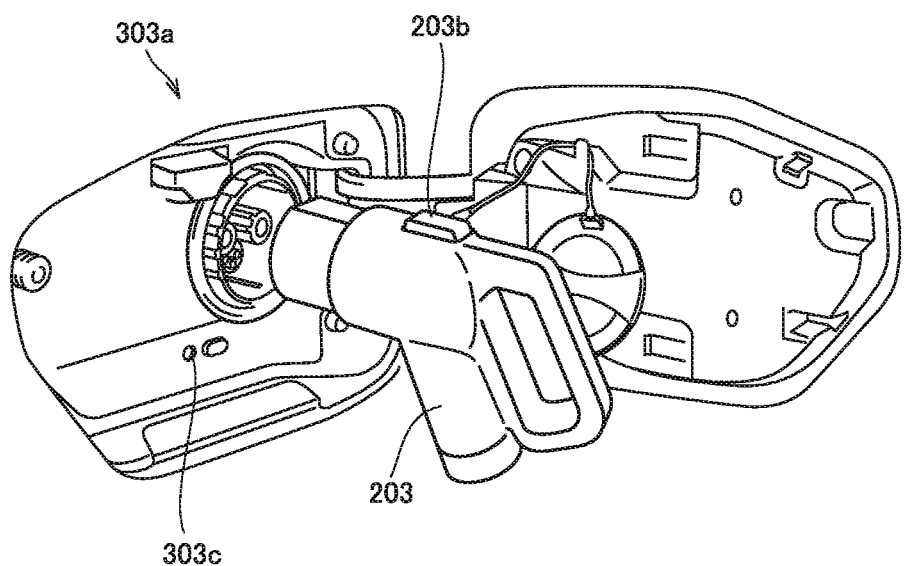
FIG. 7 shows the DC connector before connection in the portable charger according to the embodiment of the present disclosure.
Figure 8:
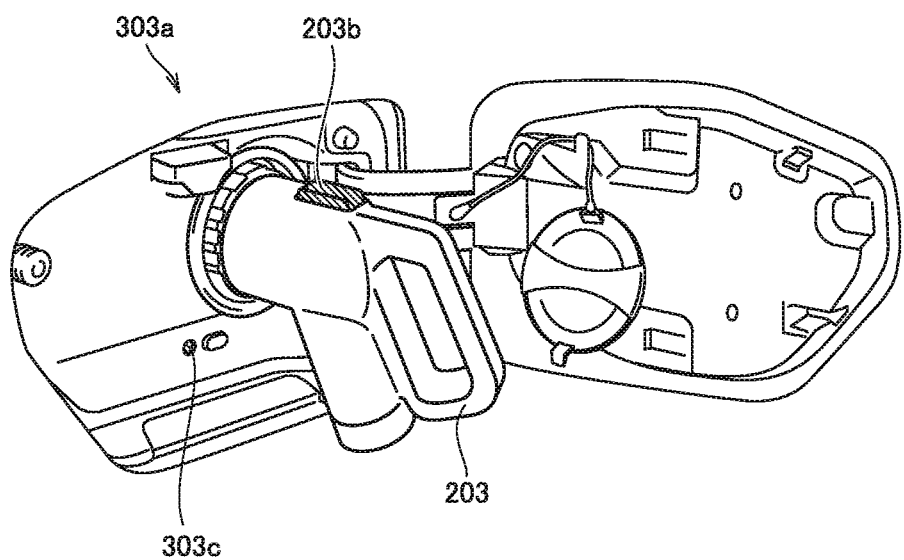
FIG. 8 shows a state in which the DC connector shown in FIG. 7 is connected to a DC inlet.

FIG. 7 shows DC connector 203 before connection. Referring to FIG. 7, in DC connector 203 before connection, start button 203b is in the light-out state. Although not shown in FIG. 7, AC plug 201 is connected to AC outlet 301a. FIG. 8 shows a state in which DC connector 203 shown in FIG. 7 is connected to DC inlet 303a. Referring to FIG. 8, when DC connector 203 is connected to DC inlet 303a, start button 203b lights up. When DC connector 203 is connected to DC inlet 303a, a lamp 303c provided in DC inlet 303a may light up. However, lamp 303c is controlled by an electrical control unit (ECU) of vehicle 303, and thus, the responsiveness of lamp 303c tends to be slower than that of start button 203b (light emitter 210).

Referring again to FIG. 6 together with FIGS. 1 and 2, in S14, controller 150 determines whether or not start button 203b has been pressed by the user. Controller 150 makes the determination in S14 based on the presence or absence of the charging start signal. Reception of the charging start signal from detector 203c by controller 150 means that start button 203b has been pressed by the user (YES in S14). Non-reception of the charging start signal by controller 150 means that start button 203b has not been pressed (NO in S14). During a time period in which determination of NO is made in S14, S11 to S14 are repeated.

When determination of YES is made in S14, controller 150 controls AC/DC conversion circuit 110 to cause DC connector 203 to output the DC power in S15. As a result, charging of power storage device 303b of vehicle 303 is started. More specifically, AC/DC conversion circuit 110 converts the AC power input from EVSE 301 to AC plug 201 into DC power and outputs the DC power to DC connector 203. Then, the DC power is supplied from DC connector 203 to DC inlet 303a of vehicle 303, thereby charging power storage device 303b.

When charging is started by the processing in S15, the series of process shown in FIG. 6 ends. Although details of charging control are not provided, the AC power supplied from AC plug 201 is converted into DC power by AC/DC conversion circuit 110 and the DC power is output from DC connector 203, thereby charging power storage device 303b. Controller 150 controls AC/DC conversion circuit 110 to thereby control the output power of DC connector 203 (and in turn the charging power of power storage device 303b). Controller 150 may control the charging power in response to a request from vehicle 303. Charging of power storage device 303b is continued until a prescribed end condition is satisfied. Then, when the end condition is satisfied, charging is stopped. For example, the end condition may be satisfied when power storage device 303b is fully charged. The end condition may be satisfied when EVSE 301 and vehicle 303 are no longer connected to each other during charging. The end condition may be satisfied when an abnormality occurs in vehicle 303 or EVSE 301 during charging.

As described above, in charger 10A according to the present embodiment, when at least one of AC plug 201 and DC connector 203 is unconnected, start button 203b is disabled. More specifically, when at least one of AC plug 201 and DC connector 203 is unconnected, controller 150 controls AC/DC conversion circuit 110 such that the DC power is not output to DC connector 203 regardless of whether or not start button 203b is operated (see FIG. 6). When at least one of AC plug 201 and DC connector 203 is unconnected, AC/DC conversion circuit 110 cuts off the electric power, and thus, start button 203b is disabled. In addition, start button 203b is also disabled when lock mechanism 220 brings start button 203b into the locked state (see FIG. 4). With the above-described configuration, output of the DC power to DC connector 203, with DC connector 203 unconnected to DC inlet 303a, is suppressed.

The structure of start button 203b is not limited to the structure shown in FIGS. 1, 4 and 5. When at least one of AC plug 201 and DC connector 203 is unconnected, start button 203b may be locked into a non-pressable state. When both of AC plug 201 and DC connector 203 are connected, start button 203b may be popped up into a pressable state.

Although start button 203b is disabled by both software of controller 150 and mechanical lock mechanism 220 in the above-described embodiment, the present disclosure is not limited thereto. Start button 203b may be disabled by only one of software of controller 150 and mechanical lock mechanism 220. Alternatively, start button 203b may be disabled by any other means.

Figure 9:
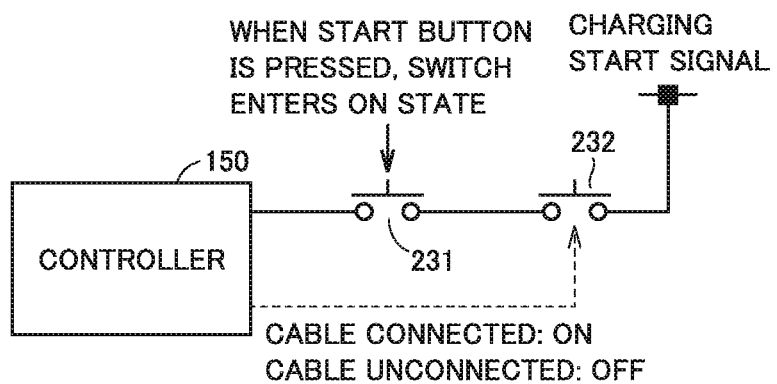
FIG. 9 shows a modification of means for disabling a start button.

FIG. 9 shows a modification of the means for disabling start button 203b. Referring to FIG. 9, this circuit includes switches 231 and 232 connected in series. Switches 231 and 232 are provided on a signal line of the charging start signal, and the charging start signal is input to controller 150 when both of switches 231 and 232 are in a closed state. Switch 231 operates in conjunction with start button 203b. When start button 203b is not pressed, switch 231 is in an open state (OFF state). When start button 203b is pressed, switch 231 enters a closed state (ON state). Switch 232 is a normally-off switch, and is in the open state during the non-conductive state. Switch 232 is controlled by controller 150. When at least one of AC plug 201 and DC connector 203 is unconnected, controller 150 brings switch 232 into the open state (OFF state). When both of AC plug 201 and DC connector 203 are connected, controller 150 brings switch 232 into the closed state (ON state). When switch 232 is in the open state, the charging start signal is not input to controller 150 regardless of whether or not start button 203b is operated. Therefore, when switch 232 is in the open state, start button 203b is disabled.

Operation panel 203d may accept a setting of timer charging from the user. Charger 10A (portable charger) may be configured such that when timer charging is set by the user, start button 203b is disabled.

Figure 10:
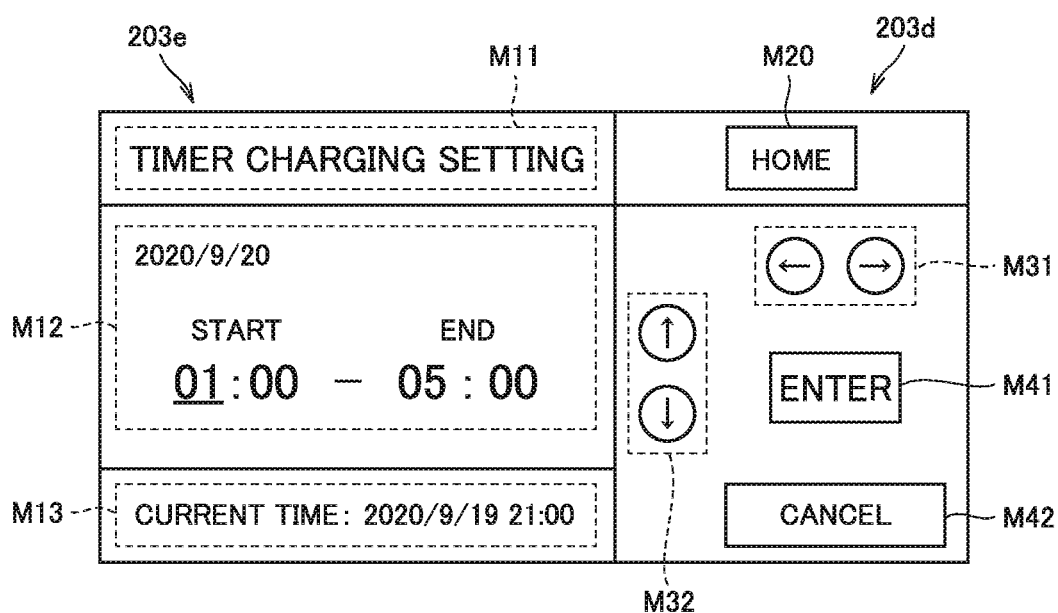
FIG. 10 shows an example of a timer charging setting screen.

FIG. 10 shows an example of a timer charging setting screen. Referring to FIG. 10 together with FIGS. 1 and 2, when the user operates operation panel 203d, a screen displayed on display 203e is switched. The user can switch the screen from a home screen (not shown) to the timer charging setting screen shown in FIG. 10, for example.

A title M11, a charging schedule M12 and the current time M13 are displayed on the timer charging setting screen. Operation panel 203d includes a home button M20, cursor keys M31 and M32, an enter button M41, and a cancel button M42. Each button included in operation panel 203d may be a physical button, or may be a virtual button displayed on a touch panel display.

Cursor keys M31 and M32 are used to input charging schedule M12. Enter button M41 is used to fix charging schedule M12. Cancel button M42 is used to cancel the fixation. The user can select an input position using cursor key M31, change the input contents (charging schedule M12) using cursor key M32, and fix the input contents using enter button M41. When enter button M41 is pressed, timer charging is set in controller 150 in accordance with charging schedule M12 (i.e., the start time and the end time input by the user). Thereafter, when cancel button M42 is pressed, the set timer charging is canceled. When home button M20 is pressed, the screen displayed on display 203e is switched to the home screen and the setting of timer charging ends.

Although the start time and the end time of timer charging are set in the example shown in FIG. 10, a method for setting timer charging is not limited to the above-described method. For example, a time period from connection of AC plug 201 and DC connector 203 to the start of timer charging may be set. Timer charging may end when a state of charge (SOC) of power storage device 303b reaches a prescribed SOC value (e.g., an SOC value indicating full charge). Operation panel 203d may be provided on housing 100A.

Figure 11:
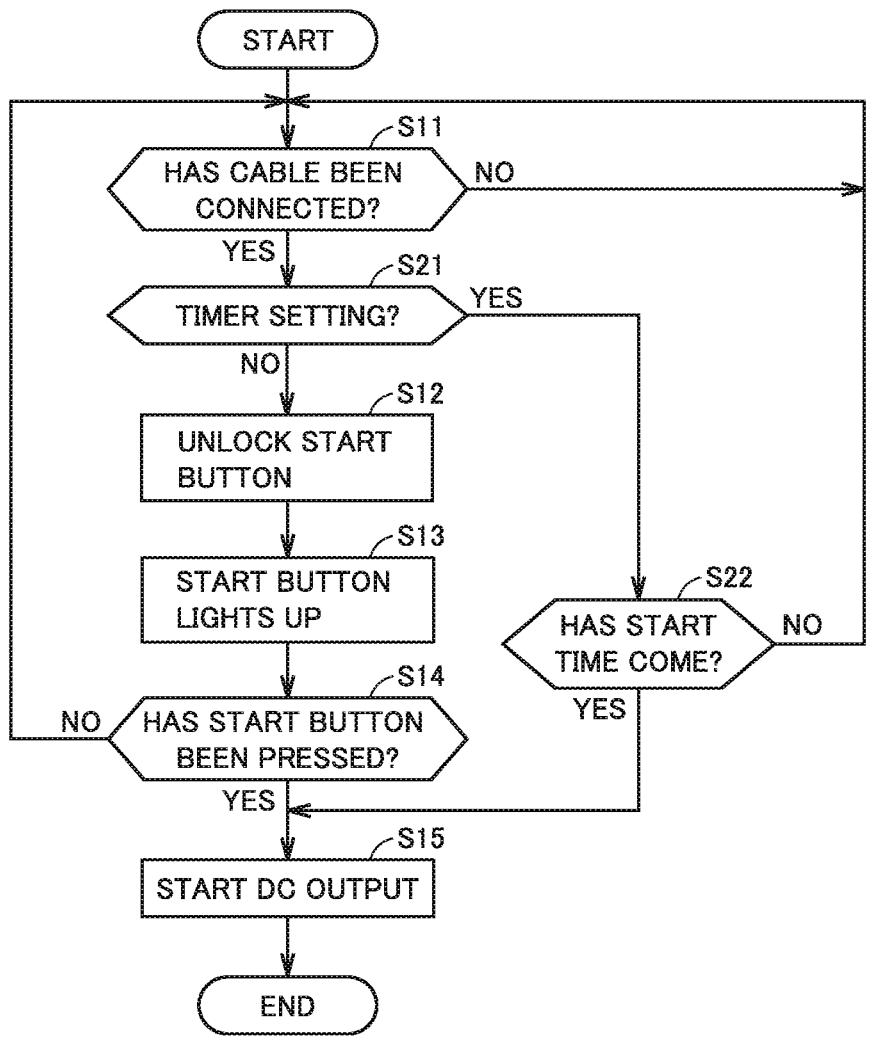
FIG. 11 is a flowchart showing a first modification of the process shown in FIG. 6.

FIG. 11 is a flowchart showing a first modification of the process shown in FIG. 6. In the process shown in FIGS. 11, S21 and S22 are added to the process shown in FIG. 6. S21 and S22 will be described below.

Referring to FIG. 11 together with FIGS. 1 and 2, S21 is provided between S11 and S12. In S21, controller 150 determines whether or not timer charging is set by the user. When timer charging is not set (NO in S21), the process proceeds to S12. When timer charging is set (YES in S21), controller 150 determines in S22 whether or not the start time of timer charging has come. When the start time of timer charging has not come (NO in S22), the process returns to S11, and S11, S21 and S22 are repeated until the start time comes. When the start time of timer charging has come (YES in S22), controller 150 controls AC/DC conversion circuit 110 to cause DC connector 203 to output the DC power in S15. As a result, charging of power storage device 303b of vehicle 303 is started.

In the portable charger according to the above-described first modification (see FIG. 11), when timer charging is set in controller 150 and when the start time of timer charging comes, with both of AC plug 201 and DC connector 203 connected, charging is started regardless of whether or not start button 203b is operated. In contrast, when timer charging is not set in controller 150, charging is started by pressing start button 203b, with both of AC plug 201 and DC connector 203 connected. According to such a portable charger, the start of charging caused by the operation of start button 203b and the start of charging caused by arrival of the start time of timer charging can be used depending on the situation. In addition, since operation panel 203d is arranged on DC connector 203, the user can perform connection of DC connector 203 and setting of timer charging as a series of process. In the above-described first modification, operation panel 203d corresponds to an example of "input device" according to the present disclosure.

Figure 12:
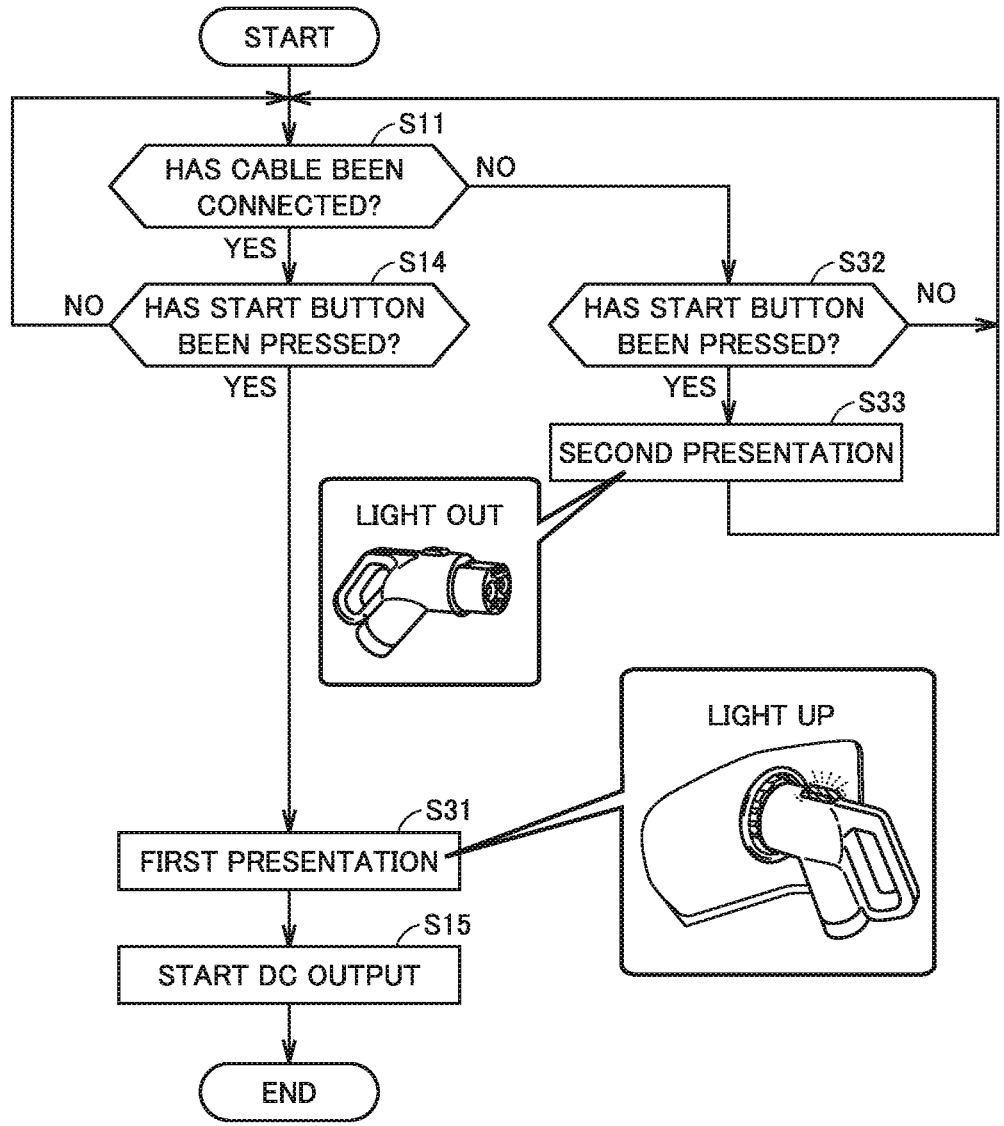
FIG. 12 is a flowchart showing a second modification of the process shown in FIG. 6.

FIG. 12 is a flowchart showing a second modification of the process shown in FIG. 6. A portable charger according to the second modification is also basically configured as shown in FIG. 2. However, in the portable charger according to the second modification, lock mechanism 220 is not provided, and thus, start button 203b is disabled only by software of controller 150. In the process shown in FIG. 12, S31 to S33 are added to the process shown in FIG. 6, and S12 and S13 (FIG. 6) are omitted. S31 to S33 will be described below.

Referring to FIG. 12 together with FIGS. 1 and 2, S31 is provided between S14 and S15. In S31, controller 150 performs control for the first presentation. Controller 150 controls light emitter 210 to cause start button 203b to light up, for example. In the second modification, causing start button 203b (including light emitter 210) to light up corresponds to the first presentation.

When at least one of AC plug 201 and DC connector 203 is unconnected (NO in S11), the process proceeds to S32. Similarly to S14, in S32, controller 150 determines whether or not start button 203b has been pressed by the user. During a time period in which determination of NO is made in S32, S11 and S32 are repeated.

When determination of YES is made in S32, controller 150 performs control for the second presentation in S33. Controller 150 controls light emitter 210 to maintain start button 203b in the light-out state, for example. In the second modification, maintaining start button 203b (including light emitter 210) in the light-out state corresponds to the second presentation.

In the portable charger according to the above-described second modification (see FIG. 12), when start button 203b is operated by the user, with both of AC plug 201 and DC connector 203 connected, start button 203b provides the first presentation, and when start button 203b is operated by the user, with at least one of AC plug 201 and DC connector 203 unconnected, start button 203b provides the second presentation different from the first presentation. In the above-described second modification, controller 150 switches the lighting state of start button 203b between the first presentation and the second presentation. According to such a portable charger, the user can more easily grasp the connection state of AC plug 201 and DC connector 203 when start button 203b is operated by the user. In the above-described second modification, controller 150 and start button 203b (including light emitter 210) correspond to examples of "presentation device" according to the present disclosure.

The first presentation (S31) and the second presentation (S33) in the process shown in FIG. 12 above are not limited to light-up and light-out of start button 203b described above. For example, start button 203b may light up in the first presentation, and may flash in the second presentation. Alternatively, controller 150 may cause start button 203b to light up in different colors in the first presentation and the second presentation. Start button 203b may light up in green color in the first presentation, and may light up in red color in the second presentation.

Controller 150 may cause display 203e to display different messages in the first presentation and the second presentation. In such a configuration, controller 150 and display 203e correspond to examples of "presentation device" according to the present disclosure. Display 203e may be provided on housing 100A.

Figure 13:
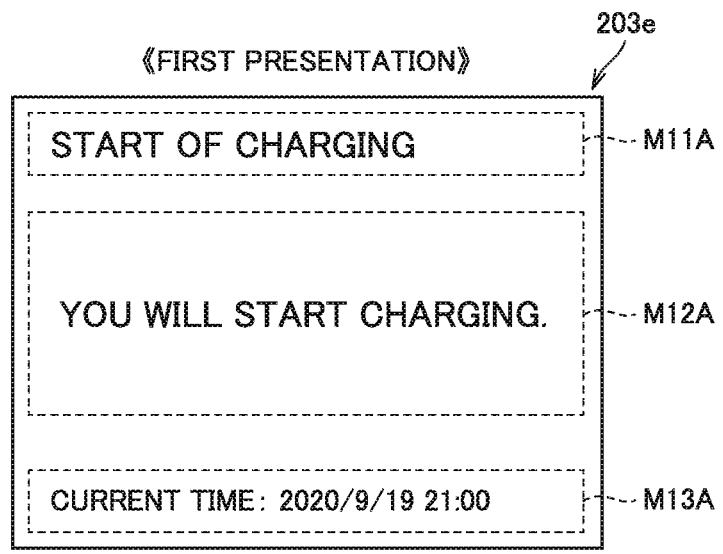
FIG. 13 shows a modification of a first presentation.

FIG. 13 shows a modification of the first presentation. Referring to FIG. 13, in the first presentation (S31 in FIG. 12), controller 150 may cause display 203e to display a charging start screen. A title M11A, a message M12A and the current time M13A are displayed on the charging start screen shown in FIG. 13. Message M12A provides notification about the start of charging.

Figure 14:
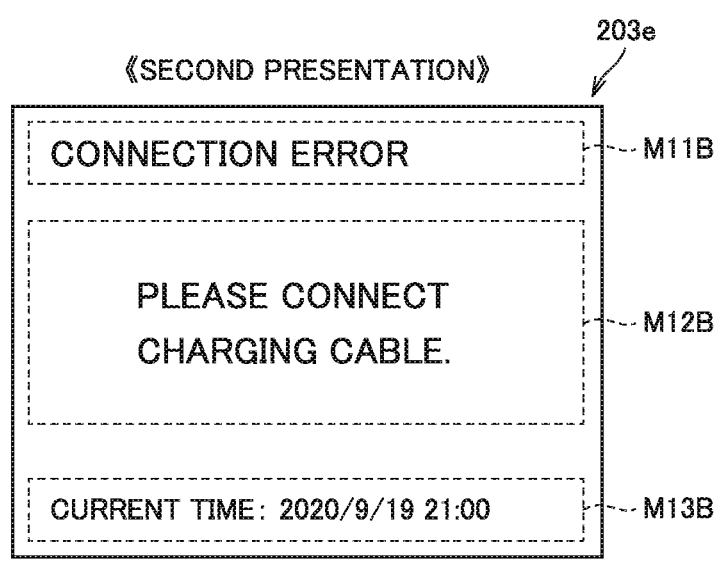
FIG. 14 shows a modification of a second presentation.

FIG. 14 shows a modification of the second presentation. Referring to FIG. 14, in the second presentation (S33 in FIG. 12), controller 150 may cause display 203e to display a connection error screen. A title M11B, a message M12B and the current time M13B are displayed on the connection error screen shown in FIG. 14. Message M12B urges connection of the portable charger (charging cable).

Controller 150 may control a speaker (not shown) to emit different sounds (including voices) in the first presentation and the second presentation. The speaker may not emit any sounds in the first presentation and may emit an error sound (sound indicating an abnormality) in the second presentation. The speaker may emit a first sound in the first presentation and may emit a second sound different from the first sound in the second presentation. The speaker may emit a voice message such as "start charging" in the first presentation and may emit a voice message such as "connect cable" in the second presentation. In these configurations, controller 150 and the speaker (not shown) correspond to examples of "presentation device" according to the present disclosure.

In the portable charger, the AC input unit that receives the AC power is not limited to the AC plug. The AC input unit of the portable charger may be an AC inlet connectable to an AC connector of an EVSE. Alternatively, the AC input unit of the portable charger may be an AC connector connectable to an AC inlet of an EVSE.

Figure 15:
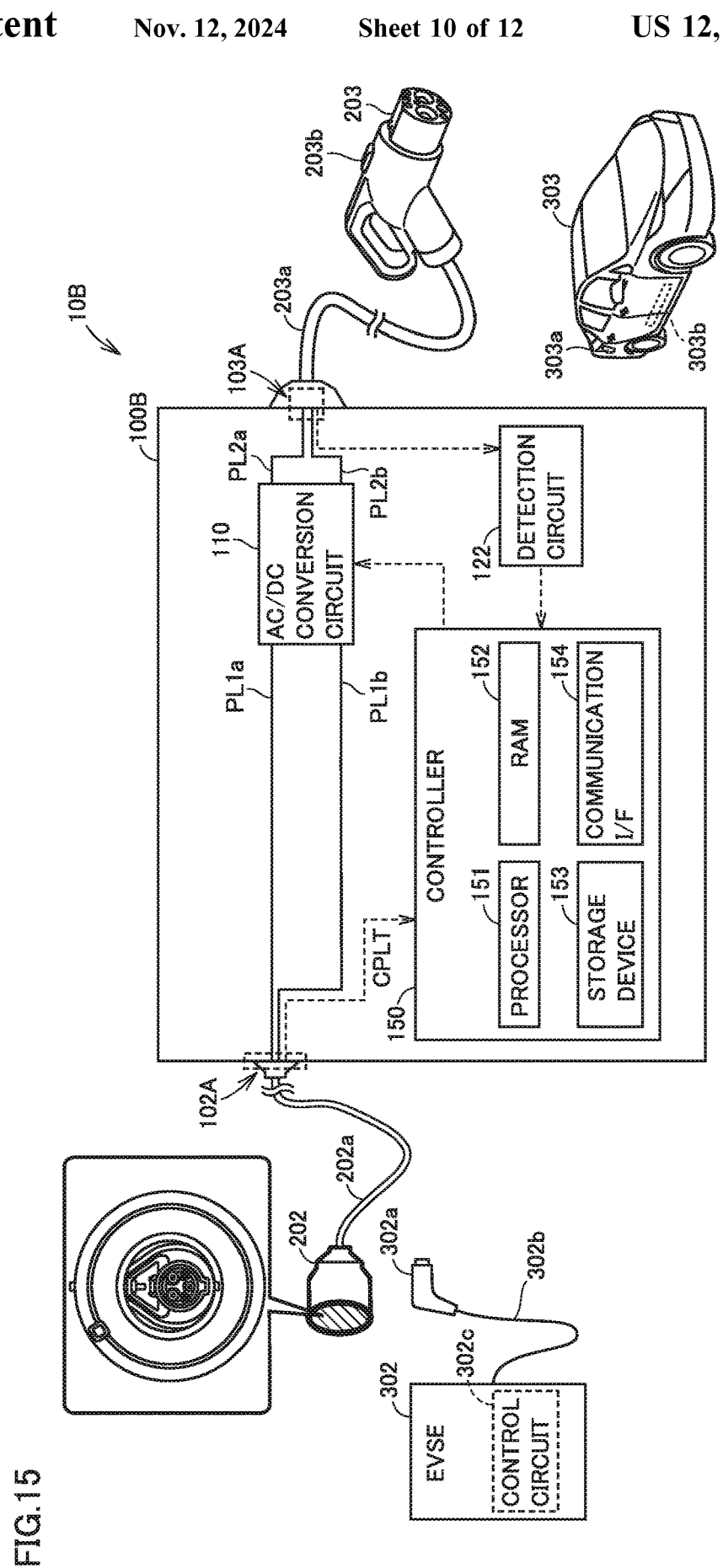
FIG. 15 shows a modification of the portable charger shown in FIG. 2.

FIG. 15 shows a modification of the portable charger shown in FIG. 2. Referring to FIG. 15, a charger 10B (portable charger) includes an AC inlet 202, a cable 202a and an AC port 102A, instead of AC plug 201, cable 201a and AC port 101A (FIG. 2). AC inlet 202 and AC port 102A are connected to each other through cable 202a. An electrical wire in cable 202a is connected to a circuit in a housing 100B through AC port 102A (wiring hole). AC inlet 202 is connectable to an AC connector 302a of an AC cable 302b of an EVSE 302. In a connected state, AC power supplied from EVSE 302 to AC inlet 202 is input to AC/DC conversion circuit 110 in housing 100B. EVSE 302 has a control circuit 302c built thereinto, and a control pilot signal (CPLT signal) is generated by control circuit 302c. Controller 150 is capable of receiving the CPLT signal. Controller 150 determines whether or not AC inlet 202 is connected, using the CPLT signal instead of voltage sensor 121 (FIG. 2). EVSE 302 may be public EVSE that can be used by many unspecified users. In the present modification, EVSE 302, AC connector 302a and AC inlet 202 correspond to examples of "power supply facility", "output unit" and "AC input unit" according to the present disclosure, respectively. EVSE 302 corresponds to an example of "second electric vehicle supply equipment" according to the present disclosure.

AC port 101A (FIG. 2) may be a connector that allows AC plug 201 to be attached and detached to/from housing 100A. Housing 100A may be connectable, through AC port 101A (connector), to a plurality of types of AC plugs that are different in specifications. AC port 102A (FIG. 15) may be a connector that allows AC inlet 202 to be attached and detached to/from housing 100B. Housing 100B may be connectable, through AC port 102A (connector), to a plurality of types of AC inlets that are different in specifications (e.g., AC inlets of Type 1 (single-phase/three-phase), Type 2 (single-phase/three-phase) and GB/T).

DC port 103A (FIGS. 2 and 15) may be a connector that allows DC connector 203 to be attached and detached to/from housing 100A or 100B. Housing 100A, 100B may be connectable, through DC port 103A (connector), to a plurality of types of DC connectors that are different in specifications (e.g., DC connectors of CHAdeMO, combined charging system (CCS), GB/T, and Tesla).

Figure 16:
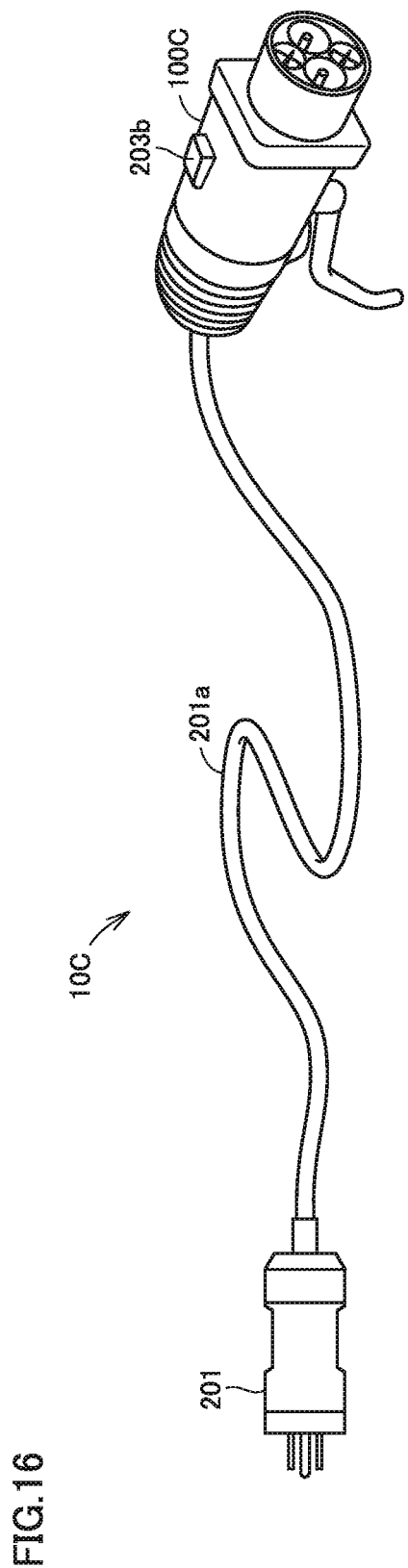
FIG. 16 shows a modification of the portable charger shown in FIG. 1.
Figure 17:
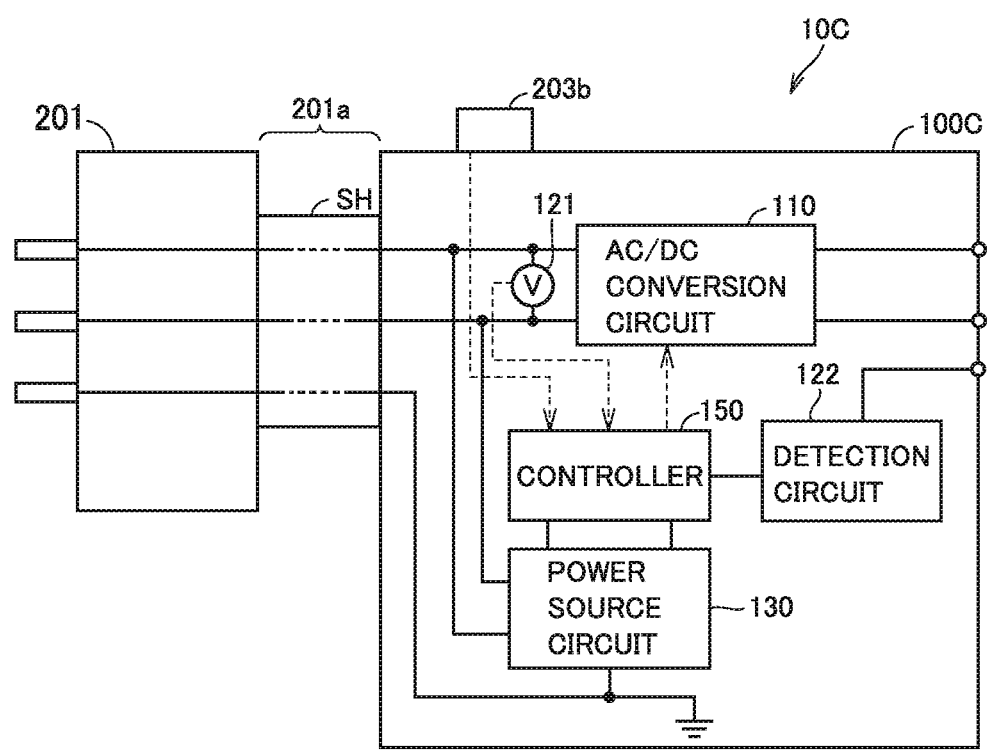
FIG. 17 shows an internal structure of the portable charger shown in FIG. 16.

In the portable charger, AC/DC conversion circuit 110 (power conversion circuit) may be housed in a housing of DC connector 203. FIG. 16 shows a modification of the portable charger shown in FIG. 1. FIG. 17 shows an internal structure of the portable charger shown in FIG. 16.

Referring to FIG. 16, a charger 10C (portable charger) includes AC plug 201 and a DC connector 100C. Cable 201a extending to AC plug 201 is directly connected to DC connector 100C. Housing 100A (FIG. 1) is not provided between AC plug 201 and DC connector 100C.

Referring to FIG. 17, cable 201a includes a sheath (outer covering) SH. A power line and a ground line of AC plug 201 are connected to DC connector 100C through sheath SH. AC/DC conversion circuit 110, voltage sensor 121, detection circuit 122, a power source circuit 130, and controller 150 are accommodated in a housing of DC connector 100C. Power source circuit 130 generates driving power for controller 150, using AC power supplied from AC plug 201. DC connector 100C is provided with start button 203b. When start button 203b is pressed, a signal indicating that start button 203b has been pressed is transmitted from start button 203b to controller 150.

Controller 150 may be capable of switching between a plurality of types of charging modes. For example, controller 150 may be capable of switching between a first charging mode and a second charging mode, the first charging mode being a mode in which charging is started when start button 203b of DC connector 100C is pressed in a cable connected state (i.e., a state in which the power supply facility and the power supply target are connected to each other), the second charging mode being a mode in which charging is started as soon as the power supply facility and the power supply target are connected to each other. Controller 150 may receive an input from the user and perform one of the first charging mode and the second charging mode in accordance with the input from the user. The user may input the charging mode to controller 150 through operation panel 203d.

Although the start switch of push button type has been illustrated in the above-described embodiment and modifications, the type of the start switch can be changed as appropriate. The start switch may be of lever type, or may be of slide type. In addition, the circuit configuration in the housing of the portable charger is not limited to the circuit configurations shown in FIGS. 2 and 15. A switch and/or a sensor may be added as necessary.

The vehicle including the power storage device is not limited to a battery electric vehicle (BEV) and may be, for example, a plug-in hybrid electric vehicle (PHEV). In addition, the power supply target (i.e., target supplied with electric power from the power supply facility through the portable charger) may be transportation means other than a vehicle (such as a ship or an airplane), or may be an unmanned mobile body (such as an automated guided vehicle (AGV), an agricultural machine, a mobile robot, or a drone), or may be a mobile device (such as a smartphone or a wearable device), or may be a building (such as a house or a factory).

While the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A portable charger comprising:
   an AC input unit connectable to an output unit of a power supply facility, the AC input unit receiving AC power from the output unit of the power supply facility;
   a DC output unit connectable to a power reception unit of a power supply target, the DC output unit outputting DC power to the power reception unit of the power supply target;

a power conversion circuit that converts the AC power input from the AC input unit into DC power and outputs the DC power to the DC output unit;
a controller that controls the power conversion circuit, wherein
the DC output unit includes a start switch,
when the start switch is operated by a user, the start switch instructs the controller to control the power conversion circuit such that the DC output unit outputs the DC power, and
when at least one of the AC input unit and the DC output unit is unconnected, the start switch is disabled, and
a lock mechanism that switches the start switch between a locked state and an unlocked state, the locked state being a state in which operation of the start switch by the user is restricted, the unlocked state being a state in which operation of the start switch by the user is permitted, wherein
when at least one of the AC input unit and the DC output unit is unconnected, the lock mechanism brings the start switch into the locked state, thereby disabling the start switch.

2. The portable charger according to claim 1, further comprising a presentation device that
provides a first presentation when the start switch is operated by the user, with both of the AC input unit and the DC output unit connected, and
provides a second presentation different from the first presentation when the start switch is operated by the user, with at least one of the AC input unit and the DC output unit unconnected.

3. The portable charger according to claim 2, wherein
the start switch is capable of lighting, and
the presentation device switches a lighting state of the start switch between the first presentation and the second presentation.

4. The portable charger according to claim 1, further comprising an input device that accepts a setting of timer charging from the user, wherein when the timer charging is set by the user, the start switch is disabled.

5. The portable charger according to claim 4, wherein the input device is arranged on the DC output unit.

6. The portable charger according to claim 1, wherein
the power supply target is a vehicle including a power storage device,
the power reception unit is a DC power inlet of the vehicle, and
the DC output unit is a DC connector connectable to the DC power inlet.

7. The portable charger according to claim 6, wherein
the power supply facility is first electric vehicle supply equipment including an electrical outlet,
the output unit is the electrical outlet of the first electric vehicle supply equipment, and
the AC input unit is an AC plug connectable to the electrical outlet.

8. The portable charger according to claim 6, wherein
the power supply facility is second electric vehicle supply equipment including a cable,
the output unit is a connector of the cable of the second electric vehicle supply equipment, and
the AC input unit is an AC inlet connectable to the connector of the cable.

9. The portable charger according to claim 1, further comprising:
a housing;
a first cable; and
a second cable, wherein
the housing has the power conversion circuit built thereinto, and
the power conversion circuit is connected to the AC input unit through the first cable and connected to the DC output unit through the second cable.

* * * * *